(12) United States Patent
Furutani (10) Patent No.: US 8,063,989 B2
(45) Date of Patent: Nov. 22, 2011

(54) TELEVISION BROADCAST SIGNAL RECEIVING APPARATUS

(75) Inventor: Senichi Furutani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 921 days.

(21) Appl. No.: 12/044,195

(22) Filed: Mar. 7, 2008

(65) Prior Publication Data

US 2009/0109338 A1    Apr. 30, 2009

(30) Foreign Application Priority Data

Mar. 9, 2007    (JP) ................................. 2007-059812

(51) Int. Cl.
*H04N 5/445* (2011.01)
(52) U.S. Cl. ........................................ 348/564; 348/565
(58) Field of Classification Search .......... 348/564–565, 348/559
See application file for complete search history.

(56) References Cited

U.S. PATENT DOCUMENTS

| | | | | |
|---|---|---|---|---|
| 6,529,246 | B1 * | 3/2003 | Maeda ........................... | 348/570 |
| 6,697,124 | B2 | 2/2004 | Dimitrova et al. | |
| 7,292,284 | B2 * | 11/2007 | Kim ............................... | 348/564 |
| 2005/0030427 | A1 * | 2/2005 | Yamada ........................ | 348/559 |

FOREIGN PATENT DOCUMENTS

| | | | |
|---|---|---|---|
| JP | 2004-521553 | A | 7/2004 |
| JP | 2005-333524 | A | 12/2005 |

OTHER PUBLICATIONS

Office Action of corresponding Japanese Application No. 200 dated Jul. 26, 2011.

* cited by examiner

*Primary Examiner* — Kristine Kincaid
*Assistant Examiner* — Sumaiya A Chowdhury
(74) *Attorney, Agent, or Firm* — Global IP Counselors (57) ABSTRACT

A television broadcast signal receiving apparatus includes a receiving unit, a control unit and a display control unit. The receiving unit is configured to receive a plurality of audio-video signals. The control unit is configured to receive operation inputs. The display control unit is configured to display images corresponding to the audio-video signals on a main screen and a subscreen in a display component at the same time. The display control unit is further configured to display an image corresponding to one of the audio-video signals, which has been displayed on the subscreen, on the main screen when the control unit receives an operation input to output audio corresponding to the one of the audio-video signals.

5 Claims, 7 Drawing Sheets

TELEVISION BROADCAST SIGNAL RECEIVING APPARATUS

CROSS-REFERENCE TO RELATED APPLICATIONS

This application claims priority to Japanese Patent Application No. 2007-059812 filed on Mar. 9, 2007. The entire disclosure of Japanese Patent Application No. 2007-059812 is hereby incorporated herein by reference.

BACKGROUND OF THE INVENTION

1. Field of the Invention

The present invention generally relates to a television broadcast signal receiving apparatus. More specifically, the present invention relates to a television broadcast signal receiving apparatus displaying a plurality of images.

2. Background Information

A conventional television broadcast signal receiving apparatus has a picture-in-picture (PinP) function or a picture-out-picture (PoutP) function. With the PinP function, one video signal source is displayed on a main screen and another video signal source is displayed on a subscreen. With the PoutP function, screen is divided in two or more and each are displayed separately (see Japanese Laid-Open Patent Application Publication No. 2004-521553, for example).

The conventional television broadcast signal receiving apparatus detects and analyzes main characteristics of a video signal, and arrangements of PinP images varies accordingly. Specifically, image sizes or image locations of the PinP images are varied.

With the conventional television broadcast signal receiving apparatus, the PinP image is prevented from being located over text, faces, or other important objects in the main screen. However, when the user wishes to view the subscreen, the user has to go through a two-step operation. Specifically, first a remote control or other such input device is used to switch the screen by manual operation, and then the volume, etc., is adjusted.

On the other hand, when the volume of a subscreen is adjusted, the subscreen in which the user is interested is still displayed on a smaller screen. Some users find such viewing unappealing.

Also, in the case of PoutP images, if the user plays the audio from a right screen while viewing a left screen, then the audio from the left screen is muted, and the image from the right screen can be viewed. However, since there is no difference in the sizes of the two screens, the viewing experience is not always good for all users.

In view of the above, it will be apparent to those skilled in the art from this disclosure that there exists a need for an improved television broadcast signal receiving apparatus. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a television broadcast signal receiving apparatus, which the user can easily operate.

In accordance with one aspect of the present invention, a television broadcast signal receiving apparatus includes a receiving unit, a control unit and a display control unit. The receiving unit is configured to receive a plurality of audio-video signals. The control unit is configured to receive operation inputs. The display control unit is configured to display images corresponding to the audio-video signals on a main screen and a subscreen in a display component at the same time. The display control unit is further configured to display an image corresponding to one of the audio-video signals, which has been displayed on the subscreen, on the main screen when the control unit receives an operation input to output audio corresponding to the one of the audio-video signals.

With the television broadcast signal receiving apparatus, it is possible to provide a television broadcast signal receiving apparatus, which the user can easily operate.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
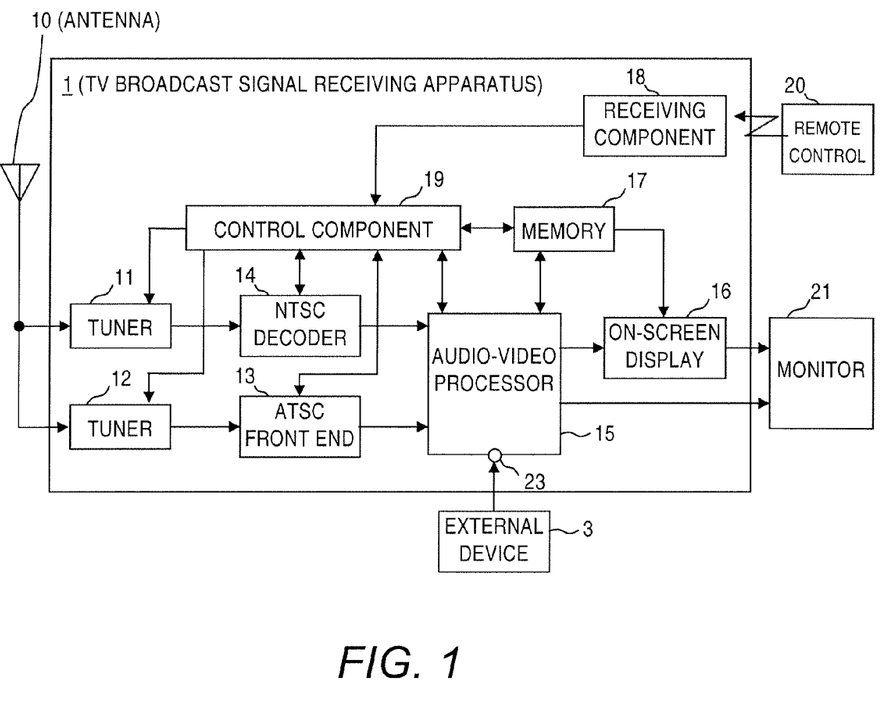
FIG. 1 is a block diagram illustrating a television broadcast signal receiving apparatus in accordance with a first embodiment of the present invention.

FIG. 1 is a block diagram of the television (TV) broadcast signal receiving apparatus 1. In this embodiment, an example will be described in which an analog tuner capable of receiving analog TV broadcast signals and a digital tuner capable of receiving digital TV broadcast signals are installed as two video signal sources. However, the two tuners may both be digital, or may both be analog. Also, the number of video signal sources is not limited to two, and may instead be three or more.

The TV broadcast signal receiving apparatus 1 receives the digital TV broadcast signal and the analog TV broadcast signal through an antenna 10. The digital TV broadcast signal and the analog TV broadcast signal are sent from a broadcasting station. The TV broadcast signal receiving apparatus 1 outputs video and audio signals contained in the TV broadcast signal to a monitor 21. The TV broadcast signal receiving apparatus 1 includes a plurality of tuners 11 and 12, an ATSC front end 13, an NTSC decoder 14, an audio-video processor (e.g., display control unit) 15, an on-screen display (OSD) 16, a memory 17, a receiving component 18 and a control component (e.g., control unit) 19. The receiving component 18 receives operation signals from a remote control 20. The control component 19 includes a CPU, ROM, RAM, etc., that controls the operation of the entire apparatus. The plurality of tuners 11 and 12, the ATSC front end 13, the NTSC decoder 14 and the audio-video processor 15 form a receiving unit configured to receive a plurality of audio-video signals.

The TV broadcast signal receiving apparatus 1 is connected to the antenna 10 to receive TV broadcast signals sent by high-frequency waves at a specific frequency from a broadcast station. The TV broadcast signal receiving apparatus 1 is also connected to the monitor 21 to display the video and output the audio of TV programs. Furthermore, the TV broadcast signal receiving apparatus 1 is connected to an external device 3 to output and input the audio-video signals to and from the TV broadcast signal receiving apparatus 1. The external device 3 is a device such as a hard disk drive (HDD) device or a digital versatile disk (DVD) device.

The tuners 11 and 12 receive a TV broadcast signal through the antenna 10. Specifically, the tuners 11 and 12 receive the TV broadcast signal of a channel that has been tuned in by tuning to the frequency corresponding to the channel selected by the user.

The ATSC front end 13 performs demodulation and error correction processing on the digital TV broadcast signal received by the tuner 12. The ATSC front end 13 also demultiplexes necessary TS (transport stream) packet from a multiplexed signal. Then, the ATSC front end 13 supplies the necessary TS packet to the various blocks in the TV broadcast signal receiving apparatus 1.

The NTSC decoder 14 decodes the analog TV broadcast signal received by the tuner 11. The NTSC decoder 14 converts the decoded video signal into a digital signal, and outputs the digital signal to the audio-video processor 15.

The audio-video processor 15 includes an MPEG video decoder, an MPEG audio decoder, a character information decoder, a PinP (picture-in-picture) circuit and a PoutP (picture-out-picture) circuit. The MPEG video decoder and the MPEG audio decoder decode TS packets including video signals and audio signals inputted from the ATSC front end 13. The character information decoder extracts character information by decoding signals including character information inputted from the ATSC front end 13 and the NTSC decoder 14. The PinP circuit produces a main screen and a subscreen by synthesizing video signals inputted from the NTSC decoder 14 and video signals decoded by the MPEG video decoder. The PinP circuit also synthesizes the character information decoded by the character information decoder on the synthesized screen. The PoutP circuit for producing a split screen (two screens) by synthesizing video signals inputted from the NTSC decoder 14 and video signals decoded by the MPEG video decoder. The PoutP circuit also synthesizes the character information decoded by the character information decoder on the synthesized screen.

The video signal processed by the audio-video processor 15 is outputted through the OSD 16 to the monitor 21. Then, video is displayed on the monitor screen. Also, the audio signal processed by the audio-video processor 15 is outputted to the monitor 21. Then, audio is outputted from a speaker (not shown). Thus, the audio-video processor 15 functions as a video output component, an audio output component, and a character information output component. The video signal and audio signal (e.g., audio-video signal) received through the tuners 11 and 12 are inputted to the audio-video processor 15. The video signal and audio signal (e.g., audio-video signal) are also inputted from the external device 3 through an external input terminal 23.

The OSD 16 superposes a specific display image over the video signal inputted from the audio-video processor 15. The memory 17 temporarily stores the MPEG-decoded video signal or the character information decoded by the character information decoder. The memory 17 also stores a display image superposed over the decoded video signal. The control component 19 executes various processing according to programs stored in a ROM (not shown). Then, the control component 19 controls the entire TV broadcast signal receiving apparatus 1, such as the ATSC front end 13 and the NTSC decoder 14.

Next, the processing of the TV broadcast signal receiving apparatus 1 when TV broadcast signals for a plurality of channels are received and displayed as PinP or PoutP (that is, in two-screen display mode) will be described. The TV broadcast signal receiving apparatus 1 receives the digital TV broadcast signal and the analog TV broadcast signal.

The tuner 11 receives the analog TV broadcast signal of a specific channel. Then, the tuner 11 outputs the received analog TV broadcast signal to the NTSC decoder 14. The analog TV broadcast signal inputted to the NTSC decoder 14 is decoded and converted into a digital signal. Then, the digital signal is inputted to the audio-video processor 15. Meanwhile, the tuner 12 receives the digital TV broadcast signal of a specific channel. Then, the tuner 12 outputs the received digital TV broadcast signal to the ATSC front end 13. The digital TV broadcast signal inputted to the ATSC front end 13 is extracted as a TS packet and inputted to the audio-video processor 15. The TS packet containing a video signal and an audio signal is subjected to an MPEG decoding in the MPEG video decoder and the MPEG audio decoder. Also, the character information contained in the analog TV broadcast signal and the digital TV broadcast signal is decoded by the character information decoder. Then, the character information is extracted.

The audio-video processor 15 synthesizes the video signal converted to the digital signal by the NTSC decoder 14, the video signal that was subjected to the MPEG decoding by the MPEG video decoder, and the character information decoded by the character information decoder. Then, the audio-video processor 15 produces video that is outputted to the monitor 21.

In the two-screen display mode (the PinP or the PoutP), the control component 19 controls the switching of the display screen according to the various operation signals sent from the remote control 20, the operating state of the external device 3 inputted through the external input terminal 23, and so on.

Specifically, the control component 19 controls the audio-video processor 15 to switch the display screen according to a selection of audio output.

Figure 2A:
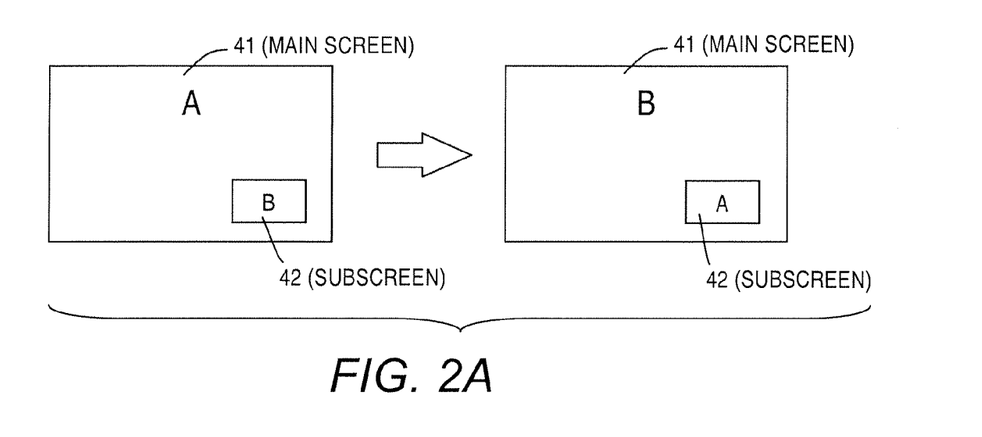
FIG. 2A is a diagram illustrating a Picture-in-Picture mode.
Figure 2B:
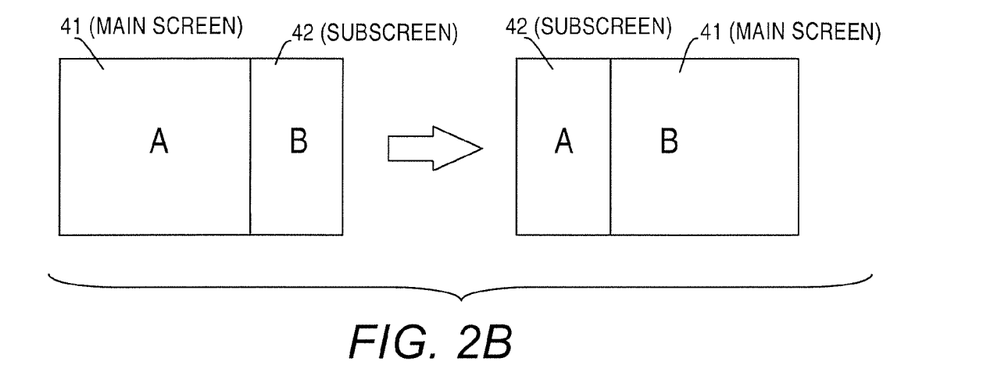
FIG. 2B is a diagram illustrating a Picture-out-Picture mode.

As shown in FIGS. 2A and 2B, in the two-screen display mode, an image A is displayed on a main screen (large screen) 41, and an image B on a subscreen (small screen) 42. The main screen 41 is larger than the subscreen 42. The image A corresponds to the audio-video signal received from the tuner 11, for example. The image B corresponds to the audio-video signal received from the tuner 12, for example. The audio corresponding to the image A displayed on the main screen 41 is outputted from a speaker (not shown), while the audio corresponding to the image B displayed on the subscreen 42 is muted.

Figure 3:
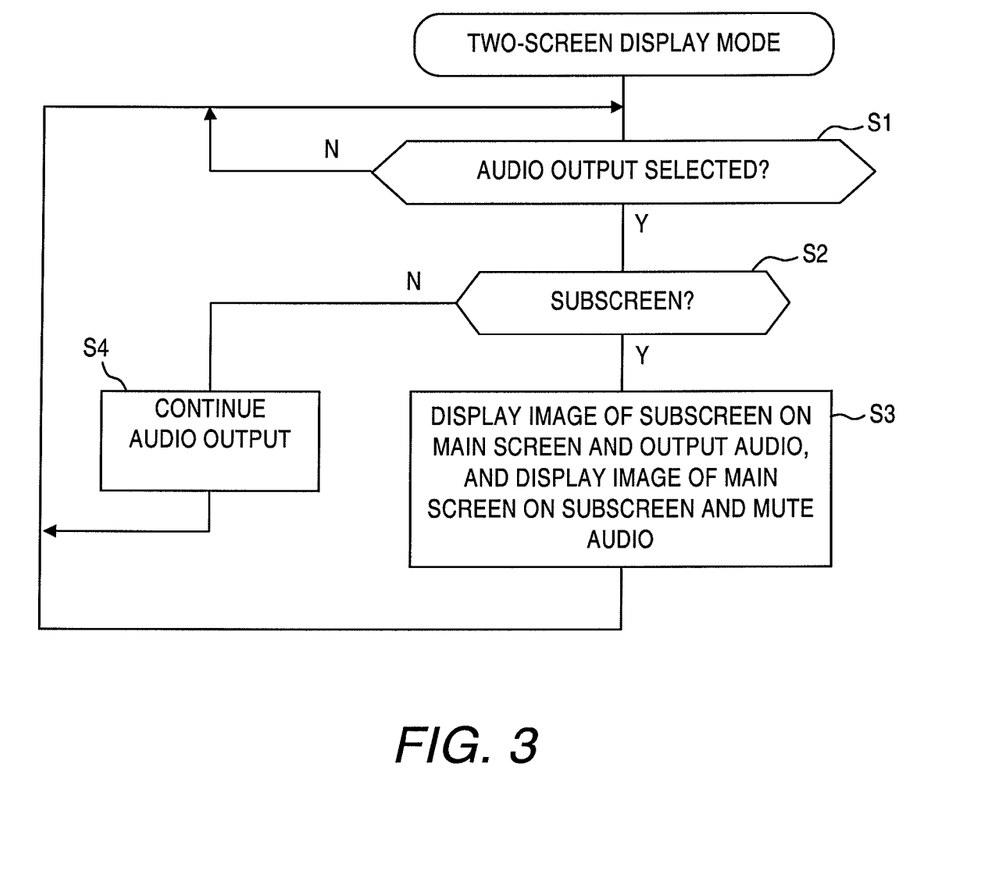
FIG. 3 is a flowchart illustrating an operation in accordance with a first embodiment of the present invention.

As shown in FIG. 3, when the control component 19 receives an operation input to select audio output for one screen from the remote control 20 (step S1), the control component 19 determines whether or not the selected audio output is for the audio corresponding to the image B displayed on the subscreen 42 (step S2). If the selected audio output is the audio output for the image A displayed on the main screen 41 (No in step S2), then no screen switching is performed. Thus, the audio output of the main screen 41 is continued according to the operation of the remote control 20 (step S4). On the other hand, if the selected audio output is for the audio output for the image B displayed on the subscreen 42 (Yes in step S2), then the control component 19 controls the audio-video processor 15 to display the image B of the selected subscreen 42 on the main screen 41. Furthermore, the control component 19 controls the audio-video processor 15 to display the image A that was been displayed on the main screen 41 on the subscreen 42. Also, the audio for the image B is outputted from the speaker, and the audio for the image A is muted (step S3). As a result, as shown in FIGS. 2A and 2B, the image B is displayed on the main screen 41 of the monitor 21, and the image A is displayed on the subscreen 42. With the picture-out-picture (PoutP) screens shown in FIG. 2B, the display locations of the images A and B are not switched as with the picture-in-picture (PinP) screens shown in FIG. 2A. However, the displayed sizes of the images A and B are changed between the main screen size and the subscreen size. In other words, switching between the main screen and the subscreen is accomplished by changing just the size, rather than changing the display location.

The audio output of the subscreen 42 can be selected using the remote control 20. Specifically, when a main screen audio output button and a subscreen audio output button are provided separately, the audio output for the subscreen 42 can be selected by pressing the subscreen audio output button.

With the TV broadcast signal receiving apparatus 1, two screens (the main screen 41 and the subscreen 42) are displayed on the monitor 21. When the user operates the remote control 20 and selects audio output for the subscreen 42, the audio for the image A that has been displayed on the main screen 41 is muted. Furthermore, the audio for the image B that has been displayed on the subscreen 42 is outputted from the speaker. At the same time, the control component 19 controls the audio-video processor 15 to display the image B on the main screen 41. Furthermore, the control component 19 controls the audio-video processor 15 to display the image A on the subscreen 42. As a result, the image for which the user has performed a remote control operation is always displayed on the main screen 41.

Specifically, with the TV broadcast signal receiving apparatus 1, the image surmised to be the one in which the user is interested can always be displayed on the main screen 41 by performing switching of the display screen simultaneously with audio switching, merely by pressing the subscreen audio output button. Thus, the user does not need to operate a screen switch button (not shown) provided to the remote control as in the past to perform screen switching. Therefore, the TV broadcast signal receiving apparatus 1 is easily operated.

Second Embodiment

The control component 19 can control the audio-video processor 15 to switch the display screen according to channel changing operation.

As shown in FIGS. 2A and 2B, in the two-screen display mode, the image A is displayed on the main screen 41, and the image B on the subscreen 42. The audio corresponding to the image A displayed on the main screen 41 is outputted from the speaker (not shown), while the audio corresponding to the image B displayed on the subscreen 42 is muted.

Figure 4:
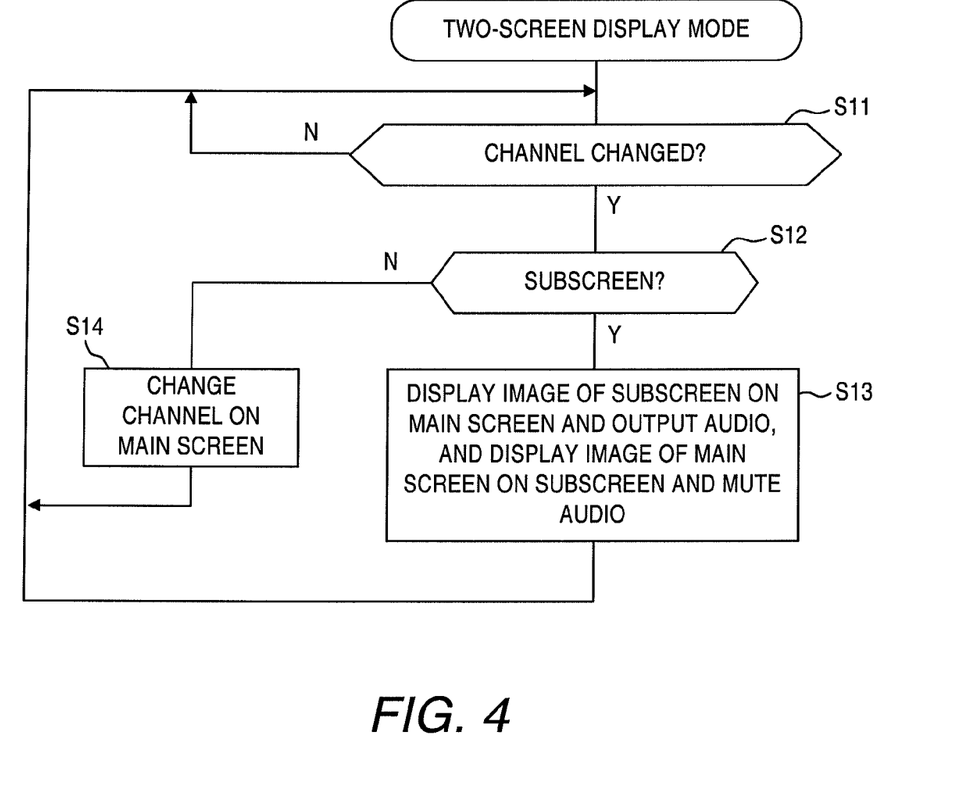
FIG. 4 is a flowchart illustrating an operation in accordance with a second embodiment of the present invention.

As shown in FIG. 4, when channel changing is performed for one screen by using the remote control 20 (step S11), the control component 19 determines whether or not the channel changing operation is a channel change for the audio-video signals corresponding to the image B displayed on the subscreen 42 (step S12). If the channel change is for the image A displayed on the main screen 41 (No in step S12), then no screen switching is performed between the main screen 41 and the subscreen 42. Then, the channel is changed for the main screen 41 according to the operation of the remote control 20 (step S14). On the other hand, if the channel change is for the subscreen 42 (Yes in step S12), then the control component 19 controls the audio-video processor 15 to display the image B of the subscreen 42 whose channel has been changed on the main screen 41. Furthermore, the control component 19 controls the audio-video processor 15 to display the image A that has been displayed on the main screen 41 on the subscreen 42. Also, the audio for the image B is outputted from the speaker, and the audio for the image A is muted (step S13). As a result, as shown in FIGS. 2A and 2B, the image B is displayed on the main screen 41 of the monitor 21, and the image A is displayed on the subscreen 42. The display screen can be switched only between the main screen 41 and the subscreen 42 by the first channel changing operation. However, an image C after the channel change can be displayed on the main screen 41 rather than the image B.

The channel can be changed on the subscreen using the remote control 20. Specifically, when a main screen channel change button and a subscreen channel change button are provided separately, the channel can be changed for the subscreen by pressing the subscreen channel change button.

With the TV broadcast signal receiving apparatus 1, two screens (the main screen 41 and the subscreen 42) are displayed on the monitor 21. When the user operates the remote control 20 and changes the channel for the subscreen 42, the audio for the image A that has been displayed on the main screen 41 is muted. Furthermore, the audio for the image B that has been displayed on the subscreen 42 is outputted from the speaker. At the same time, the control component 19 controls the audio-video processor 15 to display the image B (or the image C after the channel change) on the main screen 41. Furthermore, the control component 19 controls the audio-video processor 15 to display the image A on the subscreen 42. As a result, the image for which the user has performed a remote control operation is always displayed on the main screen 41.

Specifically, with the TV broadcast signal receiving apparatus 1, the image surmised to be the one in which the user is interested can always be displayed on the main screen 41 by performing switching of the display screen between the main screen 41 and the subscreen 42, merely by pressing the subscreen channel change button. Thus, the user does not need to operate a screen switch button (not shown) provided to the remote control as in the past to perform screen switching. Therefore, the TV broadcast signal receiving apparatus 1 is easily operated.

Third Embodiment

The control component 19 can control the audio-video processor 15 to switch the display screen according to an operating state of the external device 3 connected to the external input terminal 23. The external input terminal 23 conforms to the IEEE 1394 standard, or the HDMI (high definition multimedia interface) standard. This makes it possible for the control component 19 to recognize the operating state of the external device 3.

As shown in FIGS. 2A and 2B, in the two-screen display mode, the image A reproduced from the external device 3 is displayed on the main screen 41, and the image B of the digital TV broadcast signal received by the tuner 12, for example, is displayed on the subscreen 42. The audio corresponding to the image A displayed on the main screen 41 is outputted from the speaker (not shown), while the audio corresponding to the image B displayed on the subscreen 42 is muted.

Figure 5:
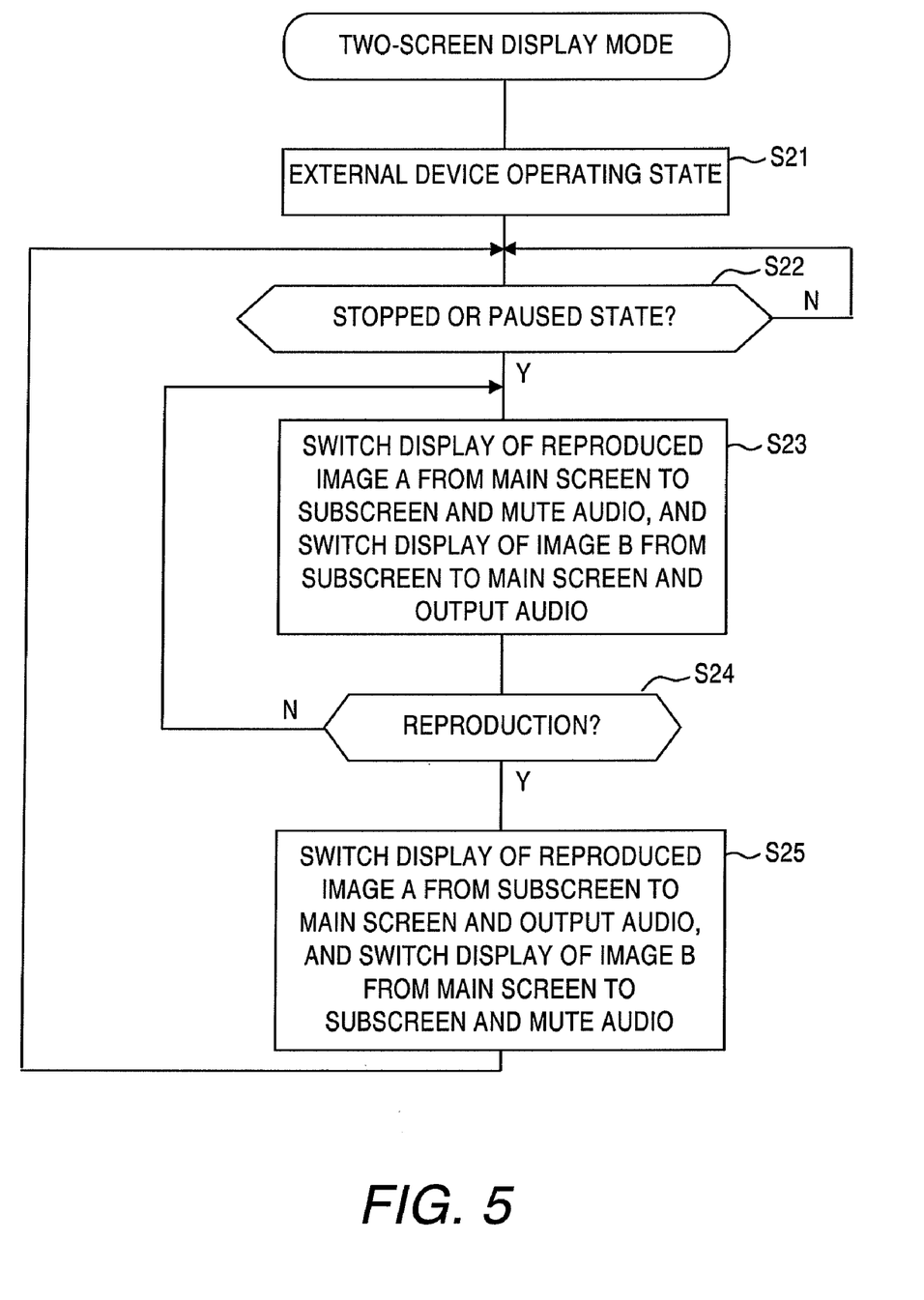
FIG. 5 is a flowchart illustrating an operation in accordance with a third embodiment of the present invention.

As shown in FIG. 5, the control component 19 constantly monitors the signal inputted from the external input terminal 23 to confirm the operating state of the connected external device 3 (step S21). When the external device 3 is switched from a reproduction state to a stopped or paused state (Yes in step S22), the control component 19 controls the audio-video processor 15 to display the image A reproduced from the external device 3 on the subscreen 42. Furthermore, the control component 19 controls the audio-video processor 15 to display the image B that has been displayed on the subscreen 42 on the main screen 41. Also, the audio for the image B is outputted from the speaker, and the audio for the image A is muted (step S23). As a result, as shown in FIGS. 2A and 2B, the image B is displayed on the main screen 41 of the monitor 21, and the image A is displayed on the subscreen 42.

Furthermore, when the external device 3 is switched back from the stopped or paused state to the reproduction state (Yes in step S24), the control component 19 controls the audio-video processor 15 to display the image A reproduced from the external device 3, which has been displayed on the subscreen 42, on the main screen 41. Furthermore, the control component 19 controls the audio-video processor 15 to display the image B, which has been displayed on the main screen 41, on the subscreen 42. Also, the audio for the image A is outputted from the speaker, and the audio for the image B is muted (step S25). The control component 19 repeats the above processing until the power to the external device 3 is turned off.

With the TV broadcast signal receiving apparatus 1, switching the display mode of two screens according to the switching operation of the operating state of the external device 3 makes the system easier for the user to operate when the external device 3 is used.

When the operating state of the external device 3 is switched from the reproduction state to the stopped or paused state, it is likely that the user has temporarily stopped watching the reproduced video screen from the external device 3 and the user intends to watch the other screen. That is, when the reproduced video displayed on the main screen 41 is paused during viewing, there is no need continue to display the paused screen on the main screen 41. Therefore, the reproduced video is switched to the subscreen 42.

With the television broadcast signal receiving apparatus 1, when the external device 3 is switched from the reproduction state to the stopped or paused state, the display screen of the image A from the external device 3 is switched from the main screen 41 to the subscreen 42. Furthermore, the display screen of the image B that has been displayed on the subscreen 42 is switched from the subscreen 42 to the main screen 41. As a result, the image surmised to be the one that the user wants to watch can always be displayed on the main screen 41. Furthermore, the screen switching operation can be performed without operating the screen switch button provided to the remote control (not shown) as in the past. Therefore, the broadcast signal receiving apparatus 1 is easily operated.

Furthermore, when the external device 3 is switched from the stopped or paused state to the reproduction state, the display screen of the image A from the external device 3 is automatically switched back from the subscreen 42 to the main screen 41. This allows the user ones again to watch the image A from the external device 3 on the main screen 41. Thus, the image surmised to be the one which the user wants to watch can always be displayed on the main screen 41. Furthermore, since the operation of screen switching can be performed without operating the screen switch button (not shown) provided to the remote control as in the past. Therefore, the TV broadcast signal receiving apparatus 1 is easily operated.

The display screen can be switched according to whether the power to the external device 3 is turned on or off. That is, when the power to the external device 3 is turned on, the video reproduced from the external device 3 is displayed on the main screen 41, and an image D that has been displayed on the main screen 41 is displayed on the subscreen 42. An image E originally displayed on the subscreen 42 can at this point be erased. Meanwhile, when the power to the external device 3 is turned off, the video screen may be switched from the main screen 41 to the subscreen 42. Then, the image D that has been displayed on the subscreen 42 can be switched to the main screen 41. Thus switching the display mode of two screens according to the on-off switching operation of the external device 3 makes the system even easier for the user to operate when the external device 3 is used.

Fourth Embodiment

The control component 19 can control the audio-video processor 15 to switch the display screen according to what is being broadcast. Specifically, the control component 19 can control the audio-video processor 15 to switch the display screen when displayed video signal switches from a program image to a commercial image. The control component 19 distinguishes between the program images and the commercial images by the difference between stereo audio and monaural audio in the analog broadcast. With the digital broadcast, the program images and the commercial images is distinguished with information that distinguishes the program images from the commercial images, which is added ahead of time to the control information included in the digital TV broadcast signal.

Figure 6:
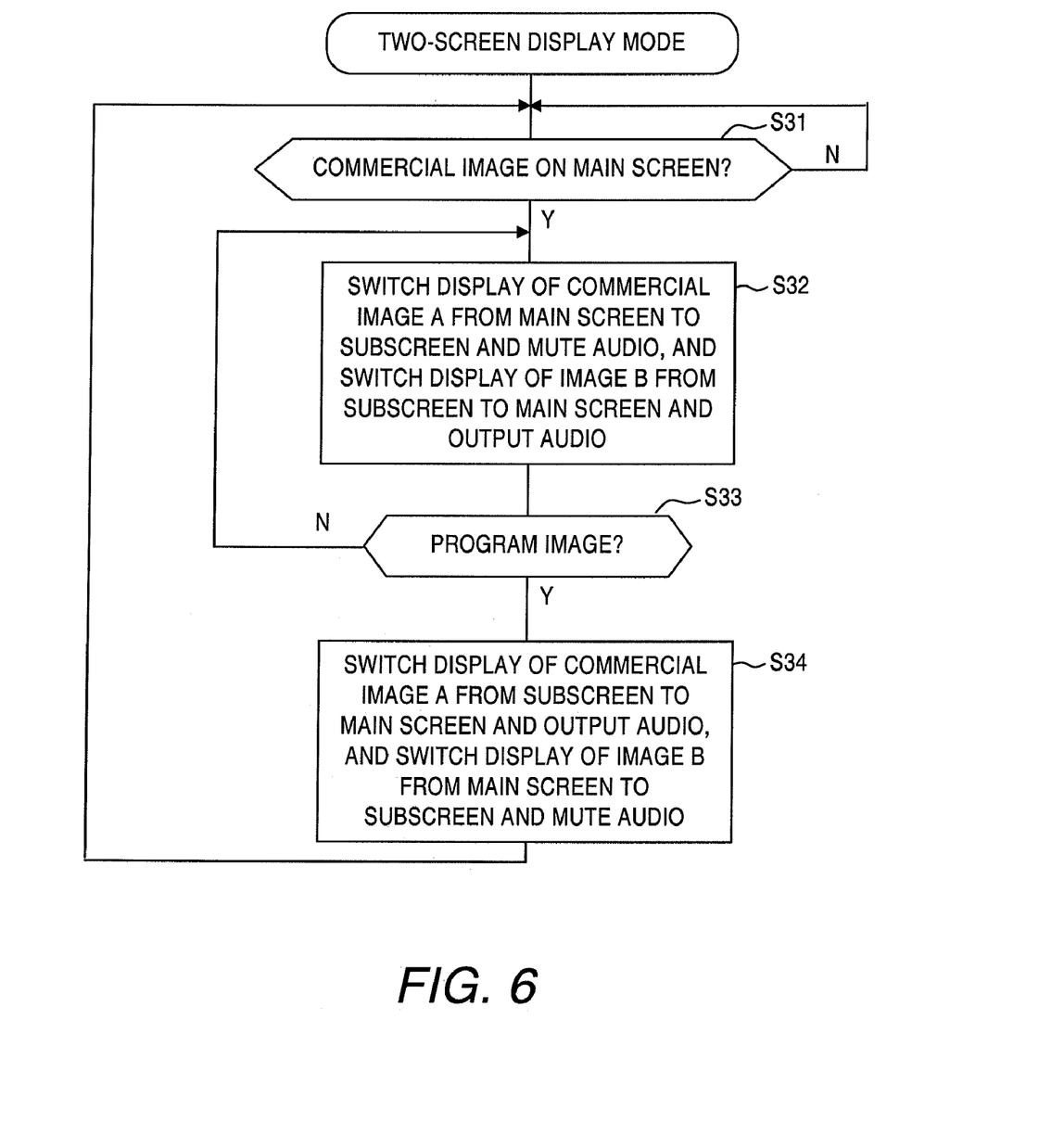
FIG. 6 is a flowchart illustrating an operation in accordance with a fourth embodiment of the present invention.

As shown in FIGS. 2A and 2B, the image A of the digital TV broadcast signal received by the tuner 12 is displayed on the main screen 41, and the image B of the analog TV broadcast signal received by the tuner 11 is displayed on the subscreen 42. As shown in FIG. 6, the control component 19 monitors whether or not the image A of the main screen 41 has switched from the program image to the commercial image (step S31). When the image A of the main screen 41 switches from the program image to the commercial image (Yes in step S31), the control component 19 controls the audio-video processor 15 to display the commercial image A on the subscreen 42. Furthermore, the control component 19 controls the audio-video processor 15 to display the image B that has been displayed on the subscreen 42 on the main screen 41. Also, the audio for the image B is outputted from the speaker, and the audio for the commercial image A is muted (step S32). As a result, as shown in FIGS. 2A and 2B, the image B is displayed on the main screen 41 of the monitor 21, and the commercial image A is displayed on the subscreen 42.

Furthermore, when the image A displayed on the subscreen 42 is switched from the commercial image to the program image (Yes in step S33), the control component 19 controls the audio-video processor 15 to display the program image A on the main screen 41. Furthermore, the control component 19 controls the audio-video processor 15 to display the image B that has been displayed on the main screen 41 on the subscreen 42. Also, the audio for the program image A is outputted from the speaker, and the audio for the image B is muted (step S34). The control component 19 repeats the above processing every time the digital TV broadcast signal displayed on the main screen 41 switches from the program image to the commercial image and from the commercial image to the program image. As a result, the user does not miss the main part of the program being watched on the main screen 41. Furthermore, during a commercial, the content of the image B displayed on the subscreen 42 can be displayed on the main screen 41. Thus, the user can check the content of the image B.

In the above-mentioned embodiments, switching of the two screen displays on the monitor 21 is performed immediately based on the selection operation of the audio output, the channel changing operation, the change in the operating state of the external device 3, or the change in the state of the broadcast content (switching between program and commercial). However, the screen display switching can be performed when a preset length of time (such as 5 seconds) has elapsed after the operations or the changes have occurred.

Figure 7A:
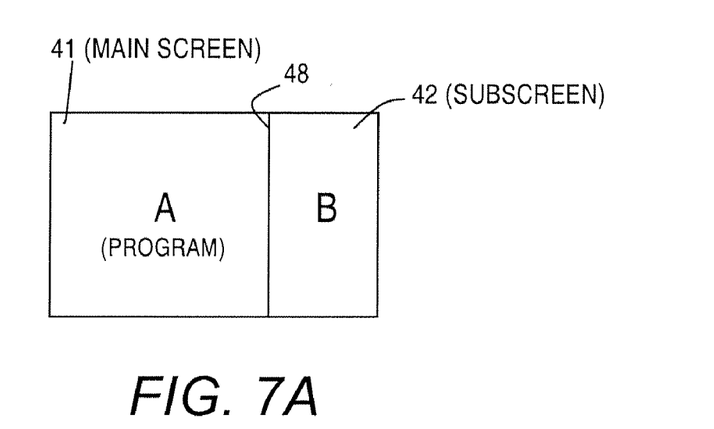
FIG. 7A is a diagram illustrating a display switching in a Picture-out-Picture mode.
Figure 7B:
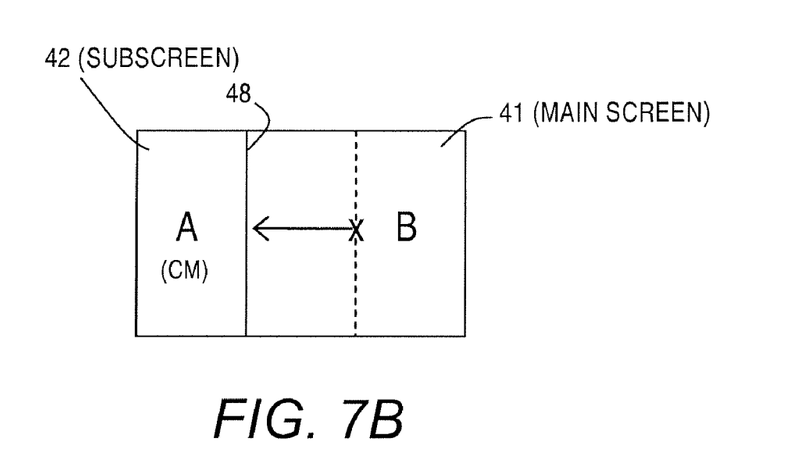
FIG. 7B is a diagram illustrating the display switching in the Picture-out-Picture mode.

Also, the switching of the screen display can be accomplished by gradually changing the screen size over the course of a specific length of time. This type of screen display switching applies to the picture-out-picture (PoutP) shown in FIG. 2B. Specifically, as shown in FIG. 7A, a dividing line 48, which is the boundary between the main screen 41 and the subscreen 42, can be gradually moved in the direction indicated by the arrow X over the course of the specific length of time. As shown in FIG. 7B, the display locations of the images A and B remain unchanged during the display switching between the main screen 41 and the subscreen 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A television broadcast signal receiving apparatus comprising:
   a receiving unit configured to receive a plurality of audio-video signals;
   a control unit configured to receive at least a first operation input generated by pressing a screen switch button of a remote control and a second operation input generated by pressing a subscreen audio output button of the remote control, the first and second operation inputs being different from each other; and
   a display control unit configured to display images corresponding to the audio-video signals on a main screen and a subscreen in a display component at the same time, the display control unit being further configured to display an image corresponding to one of the audio-video signals, which has been displayed on the subscreen, on the main screen when the control unit receives the first operation input from the remote control, the display control unit being further configured to display the image corresponding to the one of the audio-video signals, which has been displayed on the subscreen, on the main screen when the control unit receives the second operation input from the remote control to adjust audio corresponding to the one of the audio-video signals.

2. The television broadcast signal receiving apparatus according to claim 1, wherein the display control unit is further configured to display an image, which has been displayed on the main screen, on the sub screen when the control unit receives the second operation input to adjust the audio corresponding to the one of the audio-video signals.

3. The television broadcast signal receiving apparatus according to claim 1, wherein
   the display control unit is further configured to display the image corresponding to the one of the audio-video signals, which has been displayed on the subscreen, on the main screen when a preset specific length of time has elapsed after the control unit receives the second operation input to adjust the audio corresponding to the one of the audio-video signals.

4. The television broadcast signal receiving apparatus according to claim 1, wherein
   the display control unit is further configured to gradually change screen size over a preset specific length of time to display the image corresponding to the one of the audio-video signals, which has been displayed on the subscreen, on the main screen when the control unit receives the second operation input to adjust the audio corresponding to the one of the audio-video signals.

5. The television broadcast signal receiving apparatus according to claim 1, wherein
   the display control unit is further configured to display the images on the main screen and the subscreen in a picture-in-picture fashion or in a picture-out-picture fashion.

* * * * *